United States Patent [19]

Shimizu et al.

[11] Patent Number: 5,368,408
[45] Date of Patent: Nov. 29, 1994

[54] BALL-AND-SOCKET JOINT

[75] Inventors: Yoshiaki Shimizu; Hiroshi Iizuka, both of Hamamatsu, Japan

[73] Assignee: Rhythm Corporation, Hamamatsu, Japan

[21] Appl. No.: 18,562

[22] Filed: Feb. 17, 1993

[30] Foreign Application Priority Data

Feb. 28, 1992 [JP] Japan .................... 4-018872[U]

[51] Int. Cl.5 ............................................. F16C 11/00
[52] U.S. Cl. ................................... 403/140; 403/136; 403/134; 403/133
[58] Field of Search ............... 403/133, 132, 135, 136, 403/137, 134, 140

[56] References Cited

U.S. PATENT DOCUMENTS

| 2,917,334 | 12/1959 | Baker | 403/140 |
| 4,353,660 | 10/1982 | Parks | 403/132 |
| 4,695,181 | 9/1987 | Rahmede | 403/133 |
| 4,720,205 | 1/1988 | Ito | 403/140 |

Primary Examiner—Randolph A. Reese
Assistant Examiner—Anthony Knight
Attorney, Agent, or Firm—Lane, Aitken & McCann

[57] ABSTRACT

A ball-and-socket joint comprising a ball stud having a ball end, a bearing into which the ball end is inserted, and a socket, the ball stud and bearing being fixedly connected to the socket by radial inward deformation of an upper end of the socket. The bearing is provided at its lower portion with a plurality of slits and a plurality of projections. The projections are pressed against the socket and deformed elastically and compressedly by the radial inward deformation of the socket.

16 Claims, 4 Drawing Sheets

BALL-AND-SOCKET JOINT

FIELD OF THE INVENTION

The present invention relates to a ball-and-socket joint, and more particularly to such a joint which is used in the connection of various linkages.

DESCRIPTION OF THE PRIOR ART

A ball-and-socket joint wherein a ball stud having a spherical portion at its one end, a bearing, and a socket are assembled by radial inward deformation of the upper end portion of the socket, has widely been used for connecting various linkages. The bearing of this type is formed with an upper open end through which the ball stud is inserted. If the inner wall portion of the bearing is formed into a spherical shape substantially equal to the spherical portion of the ball stud, the inner diameter of the upper open end of the bearing will become smaller than the maximum diameter of the spherical portion and therefore the ball stud cannot be inserted into the bearing. For this reason, the bearing of the above kind is generally formed at its upper end portion with a plurality of slits so that the ball end can be inserted into the bearing (Japanese Utility Model Laid-open Publication No. HEI 1-96520).

Such a bearing formed with slits has the advantages that the insertion of the ball stud into the bearing is easy and the stress in the bearing produced as it is fixed to the socket by radial inward deformation of the upper end of the socket is alleviated by the slits. However, the bearing has the disadvantages that, when a force acts on the ball stud in a direction in which the ball stud is pulled out of the bearing, the support of the ball stud in that direction is reduced because of the slits.

Therefore, a ball-and-socket joint has been proposed and developed wherein, instead of the aforementioned slits, the upper end portion of the bearing is formed into a cylindrical shape substantially equal to a shape of the inner surface of the socket before radial inward deformation of the socket, and wherein the inner surface of the bearing is evenly pressed against the ball end. However, although a strength of support with respect to the load in the direction of pulling out the ball stud is enhanced, the stress in the bearing is increased because an excessive stress in the bearing upper portion produced by the radial inward deformation of the socket cannot escape. As a result, there is the drawback that a working torque of the ball stud is excessively increased.

It is, accordingly, an important object of the present invention to provide a ball-and-socket joint which is capable of overcoming the aforementioned problems.

SUMMARY OF THE INVENTION

In accordance with one important aspect of the present invention, there is provided a ball-and-socket joint comprising a ball stud having a ball end, a bearing having an upper portion and a lower portion extending from said upper portion, the bearing being formed with an inner wall portion into which said ball end is inserted, and a cylindrical socket having a cylindrical inner surface through which said bearing is inserted, an inclined surface extending downward from said cylindrical inner surface to a bottom surface and narrowing toward said bottom surface. The lower portion of said bearing is formed with a plurality of slits and is at its outer surface formed with a first inclined surface narrowing downward at an angle substantially corresponding to the angle of said inclined surface of said socket and with a second inclined surface extending from said first inclined surface and narrowing downward. The first and second inclined surfaces of said bearing are provided with a plurality of projections each engageable elastically with said inclined surface and said bottom surface of said socket. The plurality of projections of said bearing are pressed against the inclined surface and said bottom surface of said socket and are deformed elastically and compressedly by radial inward deformation of an upper portion of said socket, whereupon said ball stud, bearing, and said socket are fixedly connected together.

In the present invention, the bearing is formed at the lower portion with the slits and projections, and with these slits and projections, spaces of predetermined widths are formed between the inclined surface of the socket and the first inclined surface of the bearing and between the bottom surface of the socket and the second inclined surface of the bearing, respectively. Accordingly, the stress of the upper portion of the bearing deformed radially inwardly and pressed against the ball end by the inward deformation of the socket can escape in the direction of the bearing lower portion and is not excessively increased, so that the bearing can be pressed against the ball end with a suitable pressure in addition, dimensional errors of each component can be absorbed by the elastic and compressed deformations of the projections. Further, the elastic restoring forces of the projections act in the direction in which the bearing lower portion is pressed against the lower portion of the ball end, so that the ball stud is preloaded suitably.

In accordance with another important aspect of the present invention, there is provided a ball-and-socket joint comprising a ball stud having a ball end, a bearing having an upper portion and a lower portion extending from said upper portion, the bearing being formed with an inner wall portion into which said ball end is inserted, a cylindrical socket having upper and lower open ends and a substantially cylindrical inner surface through which said bearing having said ball end retained in said inner wall portion is inserted through said lower open end, the inner surface narrowing radially inwardly at an upper end thereof, and an end cover plate having an inclined surface widening toward said upper open end of said socket. The bearing is pressed against said upper end of said inner surface of said socket and also the end cover plate is fixed to a lower end of said socket by caulking said lower end. The lower portion of said bearing is formed with a plurality of slits and is at its outer surface formed with an inclined surface narrowing downward at an angle substantially corresponding to the angle of said inclined surface of said cover plate. The inclined surface of said bearing is provided with a plurality of projections each engageable elastically with said inclined surface of said cover plate. The plurality of projections of said bearing are pressed against the inclined surface of said cover plate and are deformed elastically and compressedly by fixing said cover plate to said lower end of said socket, whereupon said ball stud, bearing, and said socket are fixedly connected together.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
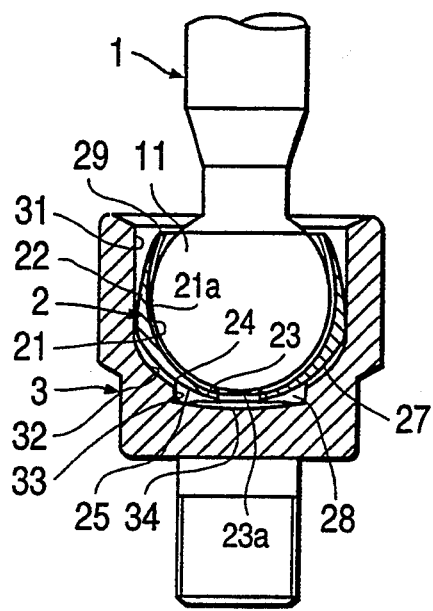
FIG. 1 is a sectional view showing an embodiment of a ball-and-socket joint according to the present invention wherein the upper portion of the socket is not deformed radially inwardly.

FIG. 1 shows a preferred embodiment of a ball-and-socket joint in accordance with the present invention. The ball-and-socket joint comprises a ball stud 1 having a ball end 11 at the lower end thereof, a bearing 2 formed from hard synthetic resin such as polyacetal and the like, and a hollow cylindrical socket 3.

The hollow cylindrical socket 3, as shown in FIG. 1, includes an open end at its upper end and a bottom surface 34 at its lower end. The socket 3 further includes an upper inner surface 31 extending downward from the upper open end and having a constant diameter, a first inclined surface 32 extending downward from the lower end of the upper inner surface 31 and narrowing toward the bottom surface 34, a second inclined surface 33 extending from the lower end the first inclined surface 32 and terminating in the bottom surface 34. The second inclined surface 33 also narrows toward the bottom surface 34.

Figure 4:
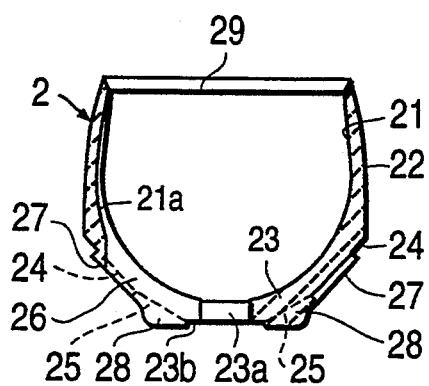
FIG. 4 is a sectional view taken substantially along the line IV—IV of FIG. 3.
Figure 5:
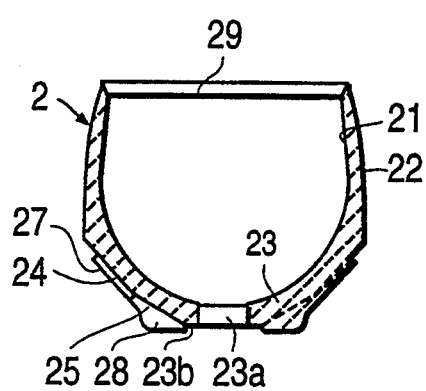
FIG. 5 is a sectional view taken substantially along the line V—V of FIG. 3.

The bearing 2, as clearly shown in FIG. 4, has an upper open end 29 and an inner wall portion 21 into which the ball end 11 of the ball stud 1 is press fitted through the upper open end 29. The bearing 2 further has an upper portion 22 which is received into the upper inner surface 31 of the socket 3, and also has a lower portion 23 extending from the upper portion 22. The lower portion 23 of the bearing 2 is formed with a bottom portion 23b having a grease reservoir 23a. Between the upper portion 22 and the bottom portion 23b, the lower portion 23 of the bearing 2 is formed with a first inclined surface 24 extending from the lower end of the upper portion 22 narrowing toward the bottom portion 23b at an angle corresponding to the angle of the first inclined surface 32 of the socket 3. The bearing 2 is further formed with a second inclined surface 25 extending between the first inclined surface 24 and the bottom portion 23. The second inclined surface 25 of the bearing also narrows toward the bottom portion 23b.

Figure 3:
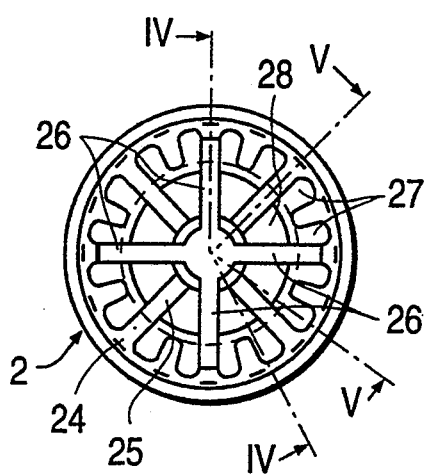
FIG. 3 is a bottom view of the bearing of FIG. 1.

As shown in FIGS. 3 and 4, the lower portion 23 of the bearing 2 is divided into a plurality of tongue-like segments by a plurality of slits 26. The first inclined surface 24 of each tongue-like segment is provided with a plurality of projections 27 so that they are elastically contacted with the first inclined surface 32 of the socket 3. Also, the second inclined surface 25 of each tongue-like segment is provided with a plurality of projections 28 so that they are elastically contacted with the second inclined surface 33 and the bottom surface 34 of the socket 3.

The upper open end 29 of the bearing 2, as shown in FIG. 1, narrows radially inwardly and the inner diameter of the upper open end 29 is substantially equal to or slightly smaller than the maximum diameter of the ball end 11 of the ball stud 1 so that the ball end 11 can be easily press fitted into the inner wall portion 21 of the bearing 2. The inner wall portion 21 of the bearing 2 is formed with a plurality of grease grooves 21 which are communicated with the grease reservoir 23a through the slits 26.

Figure 2:
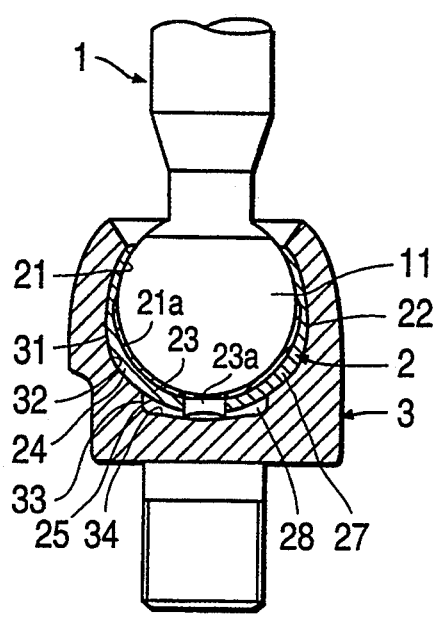
FIG. 2 is a sectional view showing the ball-and-socket joint which is in an assembly state.

In the assembly of the ball-and-socket joint, the bearing 2 is first inserted into the socket 3, and the ball end 11 of the ball stud 1 is press fitted in the inner wall 13 portion 21 of the bearing 2 through the upper open end 29. In this condition, the projections 27 of the first inclined surface 24 of the bearing lower portion 23 softly contact with the first inclined surface 32 of the socket 3, and the projections 28 of the second inclined surface 25 of the bearing lower portion 23 are slightly floated from the second inclined surface 33 and the bottom surface 34 of the socket 3. Then, the upper portion of the socket 3 is deformed radially inwardly. If the socket 3 is deformed in this way, then the portion of the bearing 2 in the vicinity of the upper open end 29 is deformed radially inwardly, as shown in FIG. 2, and the inner wall portion 21 of the bearing 2 pressed against the ball end 11 and also the bearing 2 is moved downward. As a result, the projections 27 of the first inclined surface 24 of the bearing 2 are pressed against the first inclined surface 32 of the socket 3 and are deformed elastically and compressedly. Likewise, the projections 28 of the second inclined surface 25 of the bearing 2 are pressed against the second inclined surface 33 and the bottom surface 34 of the socket 3 and are deformed elastically and compressedly. The assembly of the ball-and-socket joint is completed in the manner as described above.

In the aforementioned embodiment of the present invention, the bearing 2 is formed at the lower portion 23 with the slits 26 and projections 27 and 28, and with these 10 slits and projections, spaces of predetermined widths are formed between the first inclined surface 32 of the socket 3 and the first inclined surface 24 of the bearing and between the bottom surface 34 of the socket 3 and the second inclined surface 25 of the bearing 2, respectively. Accordingly, the stress of the upper portion 22 of the bearing 2 deformed radially inwardly and pressed against the ball end 11 by the inward deformation of the socket 3 can escape in the direction of the bearing lower portion 23 and is not excessively increased, so that the bearing 2 can be pressed against the ball end 11 with a suitable pressure. In addition, dimensional errors of each component can be absorbed by the elastic and compressed deformations of the projections 27 and 28. Further, the elastic restoring forces of the projections 27 and 28 act in the direction in which the bearing lower portion 23 is pressed against the lower portion of the ball end 11, so that the ball stud 1 is preloaded suitably.

The aforementioned projections 27 and 28, as shown in FIG. 3, are of a planar shape of sector, and two projections 27 and 27 are constituted by the radially outer portions of the planar shape of sector divided into two, and the projection 28 is constituted by the radially inner portion of the planar shape. Therefore, the projections 27 and 28 can be easily deformed elastically and compressedly.

If, like the embodiment of FIG. 1, the bearing 2 is constructed such that the upper portion 22 is of a shape narrowing slightly radially inward, the degree of the inward deformation of the upper portion 22 caused by the inward deformation of the socket 3 becomes small, and the deformation of the upper portion 22 can be made without an undue stress. In addition, even if the upper portion 22 of the 13 bearing 2 is formed into a cylindrical shape substantially conforming with the cylindrical shape of the inner surface 31 so that the ball end 11 can be easily inserted into the inner wall portion 21 of the bearing 2, the stress caused by the inward deformation of the bearing upper portion 22 is not excessively increased, as described above, because an excessive stress can be supported by the lower portion 23 of the bearing 2 having a thickness larger than that of the upper portion 22.

Figure 6:
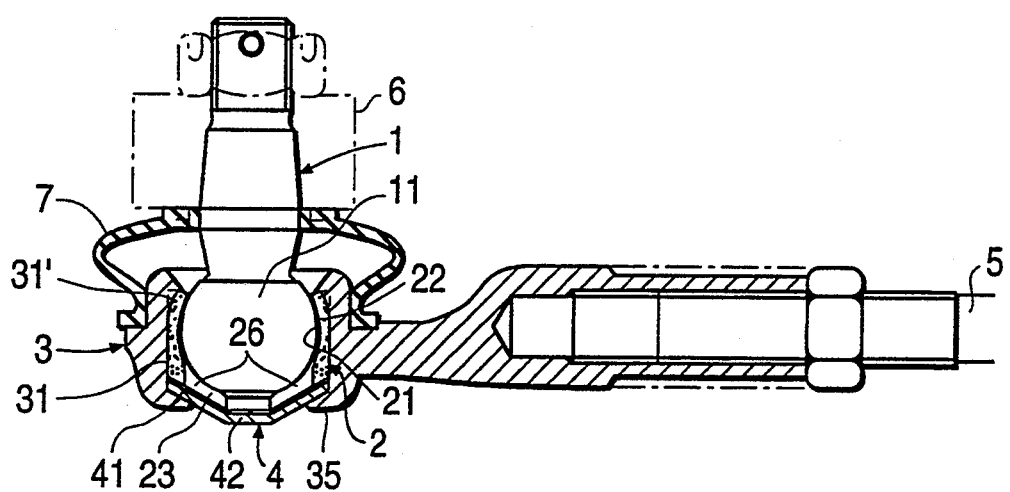
FIG. 6 is a sectional view showing another embodiment of the ball-and-socket joint according to the present invention.

FIG. 6 shows another embodiment of the ball-and-socket joint according to the present invention. In this embodiment, a cylindrical socket 3 is open at the upper and lower ends thereof, and the inner surface 31 of the cylindrical socket 3 has at the upper end portion an inclined surface 31' narrowing toward the upper end of the socket. After the ball end 11 of a ball stud 1 has been inserted into the inner wall portion 21 of a bearing 2 through the upper open end 29 of the bearing 2, the ball stud 1 received in the bearing 2 is inserted in the socket 3 through the lower open end of the socket 3. An end plate 4 is then connected to the lower surface of the lower portion 23 of the bearing 2 received in the socket 3 and is fixed to the socket 3 by caulking a caulking portion 35 of the socket 3. The present invention will be applied to a ball-and-socket joint of the type as described above. A ball-and-socket joint such as this, for example, is used in the steering device of an automobile for connecting the tie rod and the knuckle arm together. In FIG. 6, a tie rod is designated by reference numeral 5, a knuckle arm by reference numeral 6, and a dust cover by reference numeral 7.

Like the embodiment of FIG. 1, the lower portion 23 of the bearing 2 is formed with a plurality of slits 26 by which the lower portion 23 is divided into sector segments. Also, the inner wall portion 21 is formed with a plurality of grease grooves 21a, and the lower end of each grease groove 21a is communicated through a corresponding slit 26 with a grease reservoir 23a formed in the lower portion 23 of the bearing 2.

Figure 7:
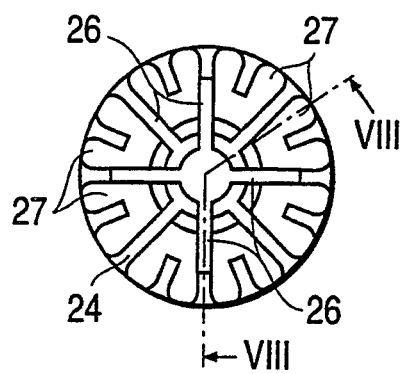
FIG. 7 is a bottom view of the bearing of FIG. 6.
Figure 8:
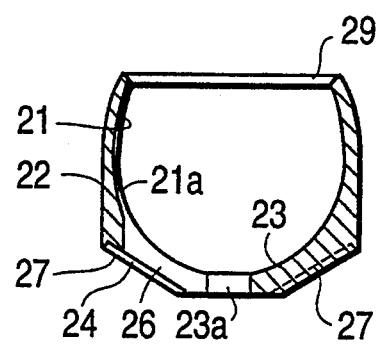
FIG. 8 is a sectional view taken substantially along the line VIII—VIII of FIG. 7.
Figure 9:
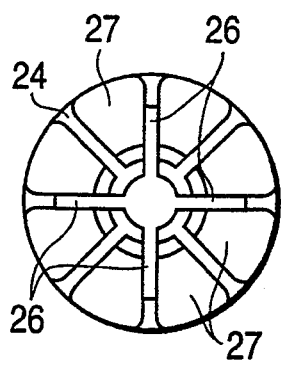
FIG. 9 is a bottom view of another embodiment of the projections of the bearing of FIG. 7.
Figure 10:
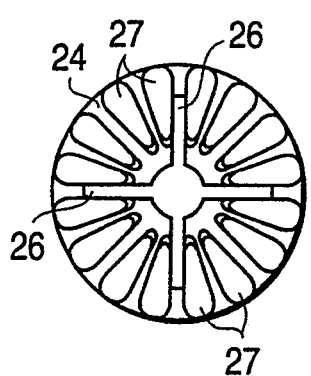
FIG. 10 is a bottom view of another embodiment of the projections of the bearing of FIG. 7.
Figure 11:
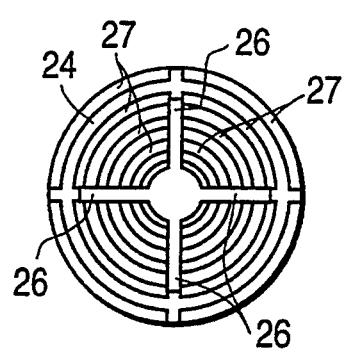
FIG. 11 is a bottom view of another embodiment of the projections of the bearing of FIG. 7.
Figure 12:
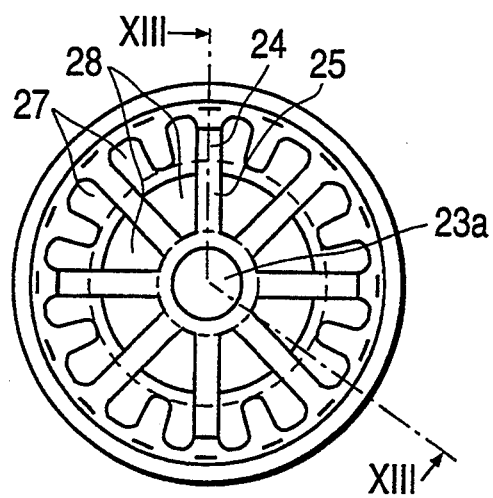
FIG. 12 is a bottom view of another embodiment of the bearing of FIG. 3.
Figure 13:
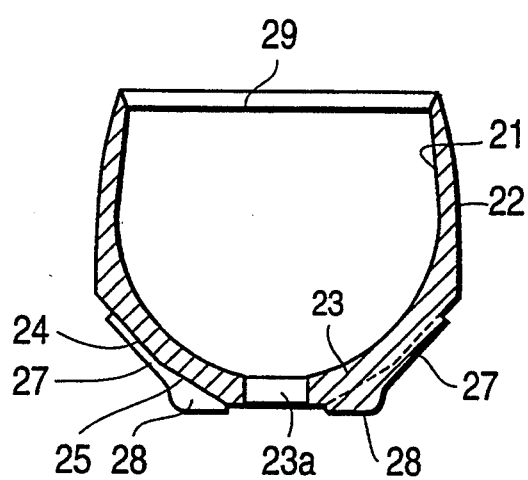
FIG. 13 is a sectional view taken substantially along the line XIII—XIII of FIG. 12.

The second embodiment of FIGS. 6-11 is different from the first embodiment of FIGS. 1-5 in that the end plate 4 comprises a central bottom surface 42 and a taper surface 41 extending radially outwardly from the bottom surface 42, that the lower portion 23 of the bearing 2 is formed at its lower surface with a taper surface 24 widening toward the upper end of the bearing 2 at an angle corresponding to the angle of the taper surface 41 of the end plate 4, and that the taper surface 24 of the bearing 2, as shown in FIGS. 7 and 8, is provided with projections 27 which are constructed such that they can contact elastically with the taper surface 41 of the end plate 4. The plurality of projections 27 of the embodiment shown in FIG. 7 each have a substantially sector shape, which is divided into two at its radially outer end portion.

The ball end 11 of the ball stud I is inserted into the inner wall portion 21 of the bearing 2 constructed as described above. As shown in FIG. 8, the upper portion 22 of 10 the bearing 2 slightly narrows radially inwardly at its upper end or the upper portion 22 is formed into a cylindrical shape having a straight wall. Accordingly, the insertion of the ball end 11 into the bearing 2 is easy. The bearing 2 having the ball stud 1 retained therein is then inserted into the inner surface 31 of the socket 3 through the lower open end of the socket 3. The bearing 2 received in the socket 3 is fixed through the end plate 4 to the socket 3 by caulking the caulking portion 35 formed in the lower end of the socket 3. The bearing 2 is moved upward by this caulking, so that the upper portion 22 of the bearing 2 is deformed inward by the inclined surface 31' of the socket 3 and pressed against the ball end 11 of the ball stud 1. At the same time, the projections 27 provided on the taper surface 24 of the bearing lower portion 23 are pressed by the taper surface 41 of the end plate 4 and deformed elastically and compressedly. With these elastic and compressed deformations of the projections 27, dimensional errors of each component can be absorbed. In addition, since the elastic restoring forces of the projections 27 act in the direction in which the bearing lower portion 23 is pressed against the lower portion of the ball end 11, a suitable preload is given to the ball stud 1. Furthermore, because of the slits 26 provided in the lower portion 23 of the bearing 2 and the space between the projections, the second embodiment can obtain the same effect of the first embodiment that the stress of the bearing 2 is not excessively increased. Although the projection 27, as shown in FIG. 7, is substantially identical in shape with the projections 27 and 28 of the first embodiment shown in FIG. 3, it is noted that the projection may also be formed into an arbitrary shape such as shapes shown in FIGS. 9-11. In the embodiment shown in FIG. 11, the projections 27 on the taper surface 24 are concentrically arranged arcuate projections. The arcuate projections 27 in each of the sections defined by the dividing grooves 26 are different from one another by being spaced at different distances from the center of the bearing.

FIG. 4 shows a third embodiment of the ball-and-socket joint according to the present invention. The third embodiment is the same as the first embodiment of FIG. 1, except that the slits 26 are not formed in the bearing lower portion 23. In this embodiment wherein slits are not provided and only projections 27 and 28 are provided in the bearing lower portion 23, the aforementioned escape of the stress of the upper portion 22 of the bearing 2, absorption of the dimensional errors and the suitable preload applied to the ball end 11 of the ball stud 1 are obtained by only the space between the projections and the elastic and compressed deformation of the projection. Therefore, in this embodiment, by arranging in a radial manner a plurality of sectors each comprising the projections 27 and 28, the substantially same effect of the first embodiment of FIG. 1 can be obtained. In addition, in the second embodiment of FIG. 6, the slit 26 can also be omitted from the bearing lower portion 23. In that case, if the projections 27 are arranged in a radial manner, as shown in FIG. 7, the substantially same effect of the first embodiment of FIG. 1 can be obtained.

While the subjection invention has been described with relation to the preferred embodiments, various modifications and adaptations thereof will now be apparent to those skilled in the art. All such modifications and adaptations as fall within the scope of the appended claims are intended to be covered thereby.

What we claim is:

1. A ball-and-socket joint comprising:
   a ball stud having a ball end;
   a bearing having an upper portion and a lower portion extending from said upper portion, the bearing being formed with an inner wall portion into which said ball end is inserted;
   a cylindrical socket having a cylindrical inner surface through which said bearing is inserted and an inclined surface extending downward from said cylindrical inner surface to a bottom surface and narrowing toward said bottom surface;
   said lower portion of said bearing being formed with a central surface portion and a plurality of slits extending radially to receive lubrication oil therein, a first inclined outer surface narrowing downward at an angle substantially corresponding to the angle of said inclined surface of said socket, and a second inclined outer surface extending from said first inclined surface and narrowing downward;
   said first and second inclined outer surfaces of said bearing being provided with a plurality of projections each radially extending from the central surface portion of said bearing and elastically engaged with said inclined surface of said socket and said bottom surface of said socket; and
   said plurality of projections of said bearing being pressed against the inclined surface of said socket and said bottom surface of said socket and being deformed elastically and compressedly by radial inward deformation of an upper portion of said socket, whereupon said ball stud, said bearing, and said socket are fixedly connected together.

2. A ball-and-socket joint as set forth in claim 1, wherein said bearing is formed from hard synthetic resin.

3. A ball-and-socket joint as set forth in claim 1, wherein each of said projections of said bearing is formed into a substantially sector shape.

4. A ball-and-socket joint as set forth in claim 1, wherein each of said projections of said bearing is formed into a substantially sector shape divided at its radially outer end portion into two.

5. A ball-and-socket joint comprising:
   a ball stud having a ball end;
   a bearing having an upper portion and a lower portion extending from said upper portion, the bearing being formed with an inner wall portion into which said ball end is inserted;
   a cylindrical socket having upper and lower open ends and a substantially cylindrical inner surface through which said bearing having said ball end retained in said inner wall portion is inserted through said lower open end, the inner surface narrowing radially inwardly at an upper end thereof;
   an end cover plate having an inclined surface widening toward said upper open end of said socket, the bearing being pressed against said upper end of said inner surface of said socket, and the end cover plate being fixed to the lower end of said socket by caulking said lower end;
   said lower portion of said bearing being formed with a central surface portion and a plurality of slits extending radially to receive lubrication oil therein and an inclined outer surface narrowing downward at an angle substantially corresponding to the angle of said inclined surface of said cover plane;
   said inclined outer surface of said bearing being provided with a plurality of projections each radially extending from the central surface portion of said bearing inner elastic engagement with said substantially cylindrical inner surface of said socket and with said inclined surface of said cover plate; and
   said plurality of projections of said bearing being pressed against the inclined surface of said cover plate and being deformed elastically and compressedly by fixing said cover plate to said lower end of said socket, whereupon said ball stud, said bearing, and said socket are fixedly connected together.

6. A ball-and-socket joint as set forth in claim 5, wherein said bearing is formed from hard synthetic resin.

7. A ball-and-socket joint as set forth in claim 5, wherein each of said projections of said bearing is formed into a substantially sector shape.

8. A ball-and-socket joint as set forth in claim 5, wherein each of said projections of said bearing is formed into a substantially sector shape divided at its radially outer end portion into two.

9. A ball-and-socket joint comprising; a ball stud having a ball end;
   a bearing having an upper portion and a lower portion extending from said upper portion, the bearing being formed with an inner wall portion into which said ball end is inserted;
   a cylindrical socket having a cylindrical inner surface through which said bearing is inserted and an inclined surface extending downward from said cylindrical inner surface to a bottom surface and narrowing toward said bottom surface;
   said lower portion of said bearing being formed with a plurality of slits extending radially to receive lubrication oil therein, a first inclined outer surface narrowing downward at an angle substantially corresponding to the angle of said inclined surface of said socket, and a second inclined outer surface extending from said first inclined surface and narrowing downward;
   said first and second inclined outer surfaces of said bearing being provided with a plurality of arcuate projections arranged concentrically of said first and second inclined outer surfaces and sectioned by each of said slits, each of said arcuate projections being elastically engaged with said inclined surface of said socket and said bottom surface of said socket; and
   said plurality of arcuate projections of said bearing being pressed against the inclined surface of said socket and said bottom surface of said socket and being deformed elastically and compressedly by radial inward deformation of an upper portion of said socket, whereupon said ball stud, said bearing, and said socket are fixedly connected together.

10. A ball-and-socket joint as set forth in claim 9, wherein said bearing is formed from hard synthetic resin.

11. A ball-and-socket joint comprising:
a ball stud having a ball end;
a bearing having an upper portion and a lower portion extending from said upper portion, the bearing being formed with an inner wall portion into which said ball end is inserted;
a cylindrical socket having upper and lower open ends and a substantially cylindrical inner surface through which said bearing having said ball end retained in said inner wall portion is inserted through said lower open end, the inner surface narrowing radially inwardly at an upper end thereof;
an end cover plate having an inclined surface widening toward said upper open end of said socket, the bearing being pressed against said upper end of said inner surface of said socket, and the end cover plate being fixed to the lower end of said socket by caulking said lower end;
said lower portion of said bearing being formed with a plurality of slits extending radially to receive lubrication oil therein and an inclined outer surface narrowing downward at an angle substantially corresponding to the angle of said inclined surface of said cover plate;
said inclined outer surface of said bearing being provided with a plurality of arcuate projections arranged concentrically on said inclined outer surface and divided into a plurality of sections by said slits, said arcuate projections in each of said sections being different from one another by being spaced at different distances from the center of the bearing, and each of said arcuate projections being elastically engaged with said inclined surface of said cover plate; and
said plurality of arcuate projections of said bearing being pressed against the inclined surface of said cover plate and being deformed elastically and compressedly by fixing said cover plate to said lower end of said socket, whereupon said ball stud, said bearing, and said socket are fixedly connected together.

12. A ball-and-socket joint as set forth in claim 11, wherein said bearing is formed from hard synthetic resin.

13. A ball-and-socket joint comprising:
a ball stud having a ball end;
a bearing having an upper portion and a lower portion extending from said upper portion, the bearing being formed with an inner wall portion into which said ball end is inserted;
a cylindrical socket having a cylindrical inner surface through which said bearing is inserted and an inclined surface extending downward from said cylindrical inner surface to a bottom surface and narrowing toward said bottom surface;
said lower portion of said bearing being formed with a first inclined outer surface narrowing downward at an angle substantially corresponding to the angle of said inclined surface of said socket and with a second inclined outer surface extending from said first inclined surface and narrowing downward;
said first and second inclined outer surfaces of said bearing being provided with a plurality of projections formed into a substantially sector shape divided at its radially outer end portion into two, each of said plurality of projections radially extending from the central surface portion of said bearing and being elastically engaged with said inclined surface of said socket and said bottom surface of said socket; and
said plurality of projections of said bearing being pressed against the inclined surface of said socket and said bottom surface of said socket and being deformed elastically and compressedly by radial inward deformation of an upper portion of said socket, whereupon said ball stud, said bearing, and said socket are fixedly connected together.

14. A ball-and-socket joint as set forth in claim 13, wherein said bearing is formed from hard synthetic resin.

15. A ball-and-socket joint comprising:
a ball stud having a ball end;
a bearing having an upper portion and a lower portion extending from said upper portion, the bearing being formed with an inner wall portion into which said ball end is inserted;
a cylindrical socket having upper and lower open ends and a substantially cylindrical inner surface through which said bearing having said ball end retained in said inner wall portion is inserted through said lower open end, the inner surface narrowing radially inwardly at an upper end thereof;
an end cover plate having an inclined surface widening toward said upper open end of said socket, the bearing being pressed against said upper end of said inner surface of said socket, and the end cover plate being fixed to a lower end of said socket by caulking said lower end;
said lower portion of said bearing being formed with an inclined outer surface narrowing downward at an angle substantially corresponding to the angle of said inclined surface of said cover plate;
said inclined outer surface of said bearing being provided with a plurality of projections each formed into a substantially sector shape divided at its radially outer end portion into two, each of said plurality of projections being elastically engaged with said inclined surface of said cover plate and radially extending from the central surface portion of said bearing to such an extent that said projections are engaged with said substantially cylindrical inner surface of said socket; and
said plurality of projections of said bearing being pressed against the inclined surface of said cover plate and being deformed elastically and compressedly by fixing said cover plate to said lower end of said socket, whereupon said ball stud, said bearing, and said socket are fixedly connected together.

16. A ball-and-socket joint as set forth in claim 15, wherein said bearing is formed from hard synthetic resin.

* * * * *